United States Patent [19]

Franklin

[11] Patent Number: 4,726,390

[45] Date of Patent: Feb. 23, 1988

[54] HOSE BIBB VACUUM BREAKER

[75] Inventor: Brian T. Franklin, Kitchener, Canada

[73] Assignee: Waltec, Inc., Cambridge, Canada

[21] Appl. No.: 28,446

[22] Filed: Mar. 20, 1987

[30] Foreign Application Priority Data

Mar. 26, 1986 [CA] Canada ................... 505111
Mar. 11, 1987 [CA] Canada ................... 531694

[51] Int. Cl.⁴ ............................................. F16K 24/00
[52] U.S. Cl. .................................. 137/218; 137/798; 137/859
[58] Field of Search .................... 137/218, 859, 798

[56] References Cited

U.S. PATENT DOCUMENTS

| | | | |
|---|---|---|---|
| 2,382,427 | 8/1945 | Langdon | 137/218 |
| 2,646,063 | 7/1953 | Hayes | 137/218 |
| 2,746,477 | 5/1956 | Krause et al. | 137/218 |
| 2,893,418 | 7/1959 | Leventhal | 137/218 |
| 2,938,532 | 5/1960 | Fraser | 137/218 |
| 3,083,723 | 4/1963 | Duchin | 137/218 |
| 3,171,423 | 3/1965 | Dillon | 137/218 |
| 3,459,443 | 8/1969 | Butters | 137/218 X |
| 3,670,760 | 6/1972 | Butcher | 137/218 |
| 3,850,190 | 11/1974 | Carlson | 137/218 |
| 4,080,981 | 3/1978 | Stewart | 137/218 |
| 4,117,856 | 10/1978 | Carlson | 137/218 X |
| 4,582,081 | 4/1986 | Fillman | 137/218 |
| 4,635,848 | 1/1987 | Little | 137/218 |
| 4,669,497 | 6/1987 | Tenhengel | 137/218 |

FOREIGN PATENT DOCUMENTS 667544 7/1963 Canada
667548 7/1963 Canada.

Primary Examiner—Gerald A. Michalsky
Attorney, Agent, or Firm—Fisher, Christen & Sabol

[57] ABSTRACT

Disclosed is a vacuum breaker and backflow prevention device for a faucet comprising a body member having a tubular outlet portion integrally joined by a web to a tubular inlet portion of larger diameter than the outlet portion, the web having a plurality of vent holes therethrough and peripherally supporting a flexible, resilient diaphragm and overlying plate member. The plate member has an outer region provided with a plurality of through holes and a central depending shank portion extending through a central hole in the diaphragm. The tubular inlet portion has internal screw threads for attachment to a faucet outlet member whereby the plate and diaphragm are retained in the tubular inlet portion by the outlet member. The tubular outlet portion has external threads for attachment of a hose coupling whereby more than slight water pressure from the faucet causes the diaphragm to flex away from the plate and the shank so that water flows through the holes in the plate and through the central hole in the diaphragm to the outlet portion and the diaphragm covers and blocks the vent holes. A back pressure condition or a vacuum in the faucet causes the diaphragm to seal around the shank and to uncover the vent holes so that water can not flow into the faucet. An air inlet valve upstream of the device ensures that it drains automatically when the faucet is turned off and no hose is connected to it.

11 Claims, 10 Drawing Figures

HOSE BIBB VACUUM BREAKER

BACKGROUND OF THE INVENTION

This invention relates to a vacuum breaker and backflow prevention device for a faucet.

Devices of this type are known in the art and are used to ensure that polluted or contaminated water is not able to flow backwards through the faucet to contaminate the water supply. Without such a device, a failure of the water supply could result in a loss of pressure and a vacuum condition which could suck water back into the supply pipes from a hose connected to a faucet and, for example, having an outlet end sitting in a pool of contaminated water.

U.S. Pat. No. 3,171,423 of Dillon issued Mar. 2, 1965 relates to a device of this type. The patent discloses an arrangement having a spring-biased valve member which can be forced open by normal water pressure. At the same time, a diaphragm covers vent holes in the device to prevent water flowing through them. In the event of a vacuum condition at the valve inlet, or backpressure at the outlet, the valve member closes on a seat and at the same time lifts the diaphragm so that the outlet portion of the device is vented to atmosphere, thus preventing any water from being drawn or forced into the faucet and hence into the supply pipe.

A somewhat similar arrangement is disclosed in U.S. Pat. No. 3,459,443 of Butters et al issued Aug. 5, 1969, although that patent primarily relates to a tamper proof coupling so that that device cannot be easily removed from a faucet.

Canadian Patent No. 667,544 of Woodford issued July 30, 1963 also relates to a device of this type, but with a different type of means for preventing removal of the vacuum breaker from a faucet.

Canadian Patent No. 667,548 relates to a vacuum breaker device, similar to those of the above patents, but uses a slitted diaphragm which is biased upwardly by a spring pushing against a spider element.

A problem with prior art vacuum breakers is that water can be trapped by them which could freeze in the winter, causing damage to the vacuum breaker and outside piping. This problem is recognized in Canadian Patent No. 667,544 which provides a means for draining the upstream piping which involves unscrewing it sufficiently to open the drain openings 8 to atmosphere. It is also known to provide a vacuum breaker with a knob which can be pulled, after the hose is removed, to allow water within the vacuum breaker to drain out. Pulling on the knob opens the valve member.

SUMMARY OF THE INVENTION

The present invention provides a vacuum breaker and backflow prevention device which does not require a movable valve member in addition to the diaphragm. Additionally, a drain valve in the vacuum breaker and an air inlet valve upstream of the device ensures that, when a hose is uncoupled from the device, both valves automatically open to drain water out of the faucet when the faucet is closed. This prevents the device and upstream piping from damage by freezing in winter weather which could occur with the prior art devices if the user forgot to actuate their drainage mechanisms.

Thus, in accordance with a broad aspect of the present invention, there is provided a vacuum breaker and backflow prevention device for a faucet comprising a body member having a tubular outlet portion integrally joined by a web to a tubular inlet portion of larger diameter than said outlet portion, said web having a plurality of vent holes therethrough and peripherally supporting a flexible, resilient diaphragm and overlying plate member, said plate member having an outer region provided with a plurality of through holes and a central depending shank portion extending through a central hole in said diaphragm defined by an inner edge adapted to seal around said shank, said tubular inlet portion having internal screw threads for attachment to a faucet outlet member whereby said plate and diaphragm are retained in said tubular inlet portion by said outlet member, said tubular outlet portion having external threads for attachment of a hose coupling whereby water pressure applied from said faucet initially causes said diaphragm to flex away from said plate to seal said vent holes while said inner edge still seals around said shank and subsequently, with increasing water pressure, causes said inner edge to flex away from said shank so that water flows through said holes in the plate and through the central hole in said diaphragm to said outlet portion and said diaphragm continues to cover and block said vent holes, whereas a back pressure condition or a vacuum in said faucet causes said diaphragm to seal around said shank and to uncover said vent holes so that water cannot flow into the faucet.

For brevity, the device will usually be referred to hereinafter as simply a "vacuum breaker" rather than a "vacuum breaker and backflow prevention device".

BRIEF DESCRIPTION OF THE DRAWINGS

Preferred embodiments of the invention will now be described in detail in conjunction with the accompanying drawings, in which.

DESCRIPTION OF THE PREFERRED EMBODIMENTS

Figure 1:
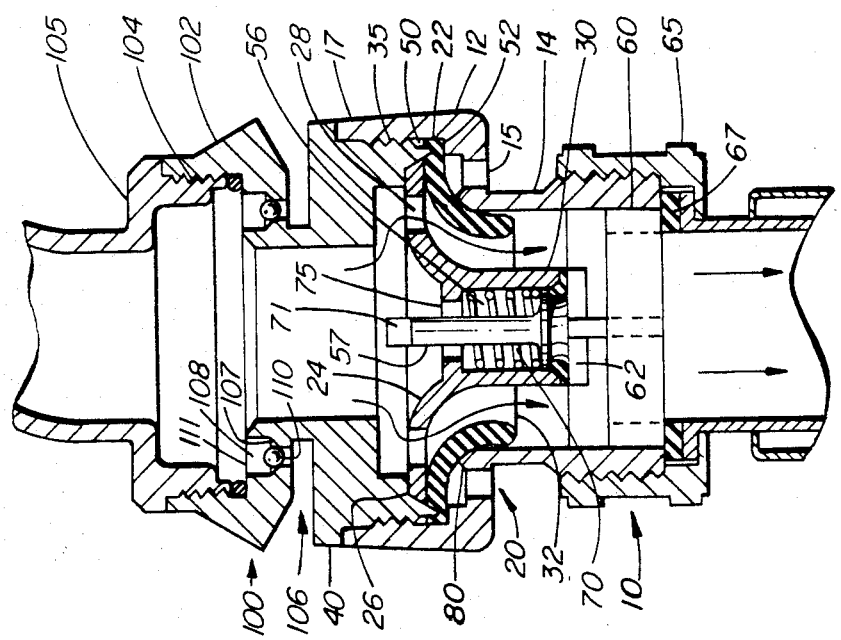
FIG. 1 is a cross-sectional view of a vacuum breaker according to the invention when fully open due to water flowing through it.
Figure 6:
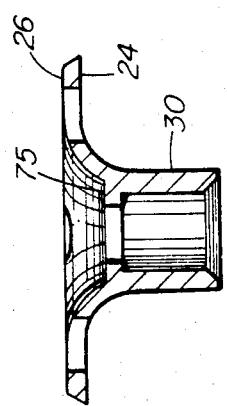
FIG. 6 is an axial cross-sectional view of the plate of FIG. 5 taken along the line 6—6.
Figure 5:
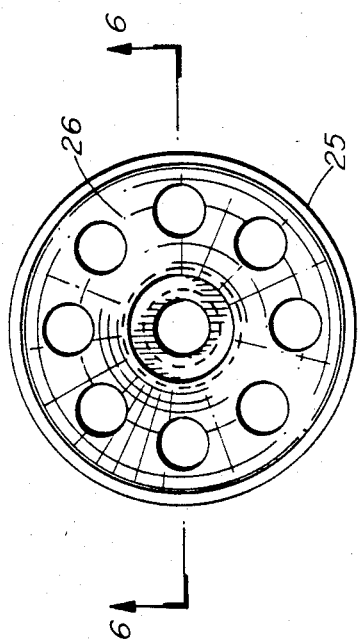
FIG. 5 is a top plan view of a plate member used in the embodiment shown in FIGS. 1–4.
Figure 9:
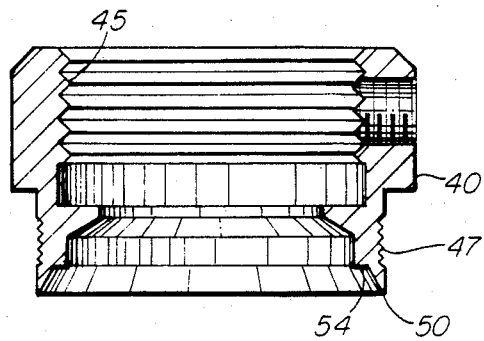
FIG. 9 is a cross-sectional view of an adapter which may be used to attach the vacuum breaker to a standard faucet.

Referring to FIG. 1 of the drawings, the vacuum breaker and backflow prevention device according to the invention is generally indicated at 10 and is seen to comprise a body member 12 having a tubular outlet portion 14 integrally joined by a web 15 to tubular inlet portion 17 of larger diameter than the outlet portion 14. The web 15 has a plurality of vent holes 20 therethrough, the web peripherally supporting a flexible, resilient diaphragm 22 and overlying plate member 24, which plate member 24 is also shown in FIGS. 5 and 6. The plate member 24 has an outer region 26 provided with a plurality of through holes 28 and a central depending shank portion 30 extending through a central hole 32 in the diaphragm 22. The tubular inlet portion 17 has internal screw threads 35 for attachment to a faucet outlet member 40. The faucet outlet member 40 may be a specially formed faucet outlet or a suitable adapter such as shown in FIG. 9, which adapter is provided with internal screw threads 45 for attachment to a standard faucet and is provided with external screw threads 47 adapted to cooperate with the internal screw threads 35 on the tubular inlet portion 17 of the body member 12. The outlet member 40 is shaped to provide an annular edge region 50 to clamp diaphragm 22 against a shoulder 52 on the web portion 15 of the body member. As best seen in FIG. 9, the faucet outlet member 40 has a shoulder region 54 which receives the plate member 28. Thus the diaphragm 22 and plate member 24 are held securely around their peripheries.

Figure 7:
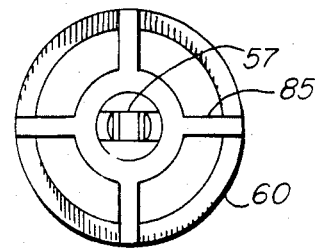
FIG. 7 is a top plan view of a closure member used in the embodiment of the vacuum breaker shown in FIGS. 1–4.
Figure 8:
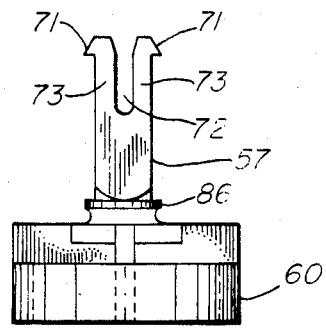
FIG. 8 is an elevational view of the closure member.

The shank 30 has an axial passageway 56 through it in which is retained a stem 57 of a passageway closure member having an enlarged base portion 60, best seen in FIGS. 7 and 8. The closure member is axially moveable between a first position (FIGS. 1-3) in which a sealing means, in this case an O-ring 62, closes the passageway 56 and a second position (FIG. 4) in which the passageway 56 is open.

Referring to FIG. 1, a hose coupling member 65 is shown attached to the outlet portion of the body member and the coupling member 65 has the usual rubber washer 67 which is of such a size as to engage the bottom of the base portion 60 when the coupling member 65 is attached to the body member 12 and the washer 67 thereby pushes the closure member upwardly to cause the O-ring 62 to close off the bottom end of the passageway 56 in the shank 30.

Figure 4:
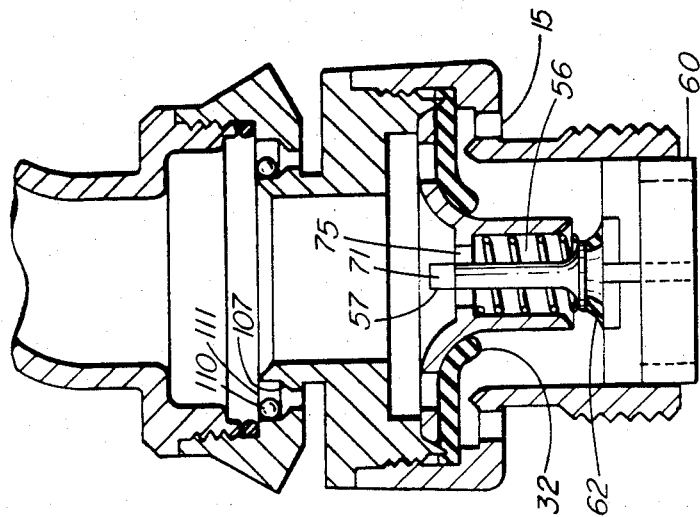
FIG. 4 is a cross-sectional view of a vacuum breaker according to the invention when the water supply is turned off and no hose is connected, that is when the device is automatically draining.

When the hose coupling is removed from the body member, as shown in FIG. 4, the closure member move downwardly. In this preferred embodiment, downward movement is ensured by the provision of a helical spring 70 surrounding the stem 57 and having a first end engageable with the base portion 60 of the closure member and a second end engageable with an internal shoulder (not referenced) on the upper end of the shank portion 30.

Turning briefly to FIGS. 7 and 8, it will be seen that the upper end of the stem 57 is provided with clips 71. A slot 72 is provided at the upper end of the stem 57, creating two legs 73. The closure member is preferably formed of plastic and the legs 73 are sufficiently flexible so that when the stem is inserted in the shank from the bottom, the clips 71 can pass through the hole 75 in the plate member (see FIG. 1) and then spring outwardly to engage the plate member adjacent the hole 75. With no hose connected to the body member the closure member assumes the position shown in FIG. 4 in which passageway 56 in shank 30 is open.

FIG. 1 illustrates the device under the condition of full flow through it. Water pressure from the faucet (not shown) deflects the diaphragm 22 downwardly, opening wide the central hole 32 from the position shown in FIG. 3, for example, where the diaphragm seals against the shank. At the same time, the diaphragm seals against the annular shoulder 80 and seals off the vent holes 15 so that water cannot flow through them.

Figure 2:
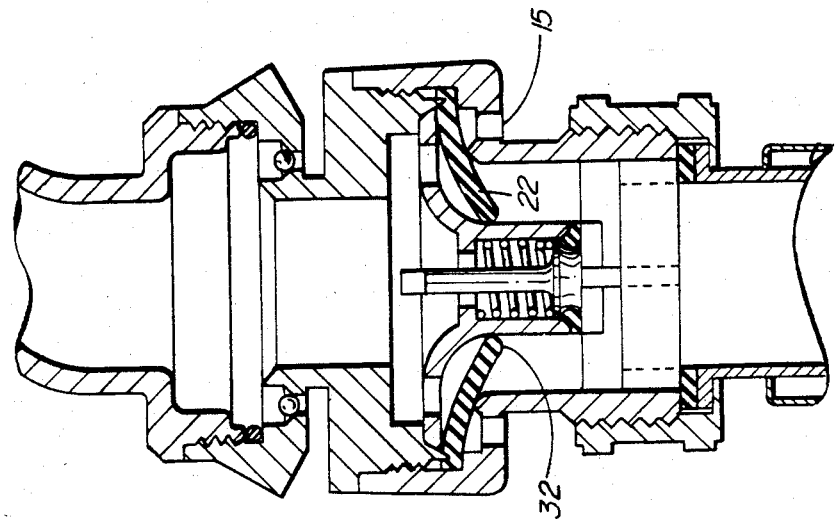
FIG. 2 is a cross-sectional view of a vacuum breaker according to the invention when only slight water pressure is applied to its inlet.

FIG. 2 shows the device according to the invention when there is only slight water pressure from the faucet, e.g. up to about 3 p.s.i., which can occur as the faucet is being initially opened. In this case, the inner edge of the diaphragm, defining the central hole 32, still seals against the shank member, but the diaphragm flexes downwardly intermediate its inner and outer edges to also seal off the vent holes 15. No water can leave the device and the vent holes 15 are sealed off before, with increasing water pressure, the diaphragm flexes away from the shank portion 30 to permit water to flow through the central hole 32 in the diaphragm and hence to the attached hose.

Figure 3:
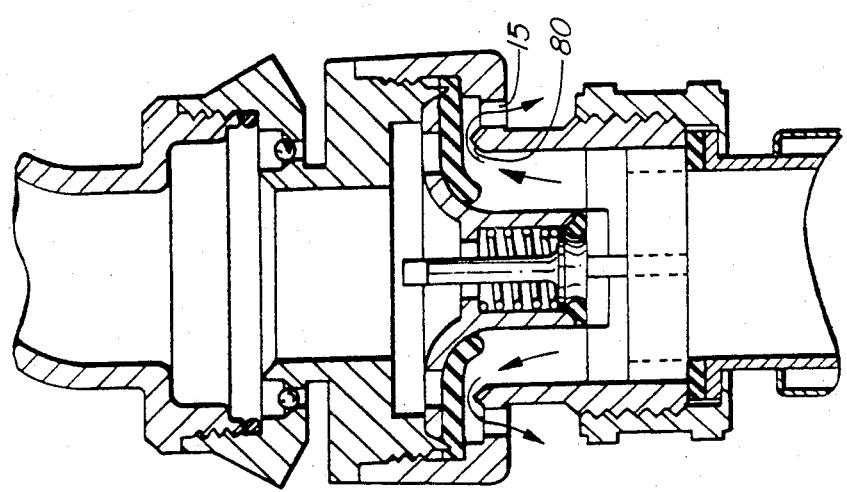
FIG. 3 is a cross-sectional view of a vacuum breaker according to the invention when a vacuum condition is applied to its inlet.

FIG. 3 shown the situation in which a vacuum is applied to the inlet end of the device. In this case, the diaphragm still seals against the shank of the plate member, but it lifts off the shoulder 80 so that water from the hose can flow out through the vent holes 15. Thus, no water enters the faucet. As clearly seen in FIG. 7, the base portion 60 of the closure member is annular and is connected to the stem portion 57 by ribs 85. Water flows through the spaces between the ribs.

As best seen in FIG. 8, the closure member has a shoulder 86 for retaining the O-ring 62 (not shown in FIG. 8) between it and the base portion 60 of the closure member.

In order to enable automatic draining of water upstream of the vacuum breaker it is necessary to provide an air intake valve. This is required because the water trapped between the valve shut-off point and the vacuum breaker outlet is in a "closed container". The axial passageway 56 through shank 30 is not large enough to allow both water exit and air entry to occur. Water surface tension prevents this exchange.

Referring to FIG. 1, the air intake valve, generally indicated at 100, comprises an air intake adapter 102 having threads 104 for attachment to a faucet outlet 105. Adapter 102 is provided with a plurality of ports 106 having valve seats 107 at the bottom of chambers 108. Check balls 110 are retained in chambers 108 by retaining rings 111. When the faucet is in use, whether a hose is attached or not, the restrictions in the vacuum breaker create a back pressure which forces the check balls onto the seats 107. A drip tight seal is produced at approximately 20 p.s.i or above.

When the faucet is shut off and the hose removed, the closure member assumes the position shown in FIG. 4 in which passageway 56 in shank 30 is open. Air entry into the "closed container" is achieved by check balls 110 lifting off their seats 107. (FIG. 4 illustrates them as being up against the retaining rings 111). The lifting force is the result of the difference in atmospheric and water pressures. The water pressure is less than atmospheric by the vertical distance between the water exit level and air entry level. Air will now replace the water leaving the "closed container" preventing an air lock from occurring. This will continue until substantially all of the water has drained.

FIGS. 1 to 4 show the air intake ports immediately upstream of the vacuum breaker but they may be located anywhere between the faucet shut off point and the vacuum breaker outlet provided the port sizing and vertical difference criteria are met.

On completion of water drainage out of the faucet there will be water remaining in the pockets and small cavities within the faucet and vacuum breaker itself. Upon freezing no physical damage occurs but operation of the air intake check valve and vacuum breaker drain passage is prevented if these cavities are filled with ice.

When opening the faucet, hose attached or not, water pressure will force the rubber diaphragm open and begin to flow. Water will then warm the vacuum breaker and melt the ice. The time required to completely melt the ice and make both the air intake adapter and vacuum breaker operational depends on water temperature, vacuum breaker temperature, and air intake design. Applicant's present design permits resumption of operation in less than 5 seconds, or 1 cup of water, upon turning the faucet on.

During initial faucet operation water may flow out the air intake ports. If the check ball happens to be frozen off center then, when the ice in the check ball cavity partially melts, water can flow out until the ball unfreezes and moves over the port.

Figure 10:
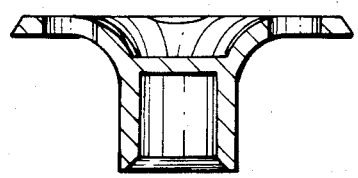
FIG. 10 is a cross-sectional view of a plate member which may be used in a modification of the embodiment shown in FIGS. 1–4.

FIG. 10 illustrates a plate member used in a modification of the device as shown in FIGS. 1 to 3. In this case, there is no hole 56 such as shown in FIG. 1 and, of course, the elimination of hole 56 means that no closure member can be used; no closure member is required in this modification. However, this modified arrangement will not drain when a hose is removed and is only suitable for indoor use. Aside from elimination of the self-draining feature, the device functions in exactly the same way as the arrangement shown in FIGS. 1 to 3.

The plate member is preferably formed of plastic, as is the base member, aside from the spring and O-ring. The diaphragm may be formed of rubber.

What I claim as my invention is:

1. A vacuum breaker and backflow prevention device for a faucet comprising a body member having a tubular outlet portion integrally joined by a web to a tubular inlet portion of larger diameter than said outlet portion, said web having a plurality of vent holes therethrough and peripherally supporting a flexible, resilient diaphragm and overlying plate member, said plate member having an outer region provided with a plurality of through holes and a central depending shank portion extending through a central hole in said diagram defined by an inner edge adapted to seal around said shank, said tubular inlet portion having internal screw threads for attachment to a faucet outlet member whereby said plate and diaphragm are retained in said tubular inlet portion by said outlet member, said tubular outlet portion having external threads for attachment of a hose coupling whereby water pressure applied from said faucet initially causes said diaphragm to flex away from said plate to seal said vent holes while said inner edge still seals around said shank and subsequently, with increasing water pressure, causes said inner edge to flex away from said shank so that water flows through said holes in the plate and through the central hole in said diaphragm to said outlet portion and said diaphragm continues to cover and block said vent holes, whereas a back pressure condition or a vacuum in said faucet causes said diaphragm to seal around said shank and to uncover said vent holes so that water cannot flow into the faucet, wherein said shank has an axial passageway through it in which is retained a stem of a passageway closure member having an enlarged base portion, said closure member being axially movable between a first portion in which a sealing means on said base portion closes said passageway and a second position in which said passageway is open, said base portion being engageable by a washer of a hose coupling whereby, when a hose is connected to said outlet portion, said stem is moved to said first position whereas, when a hose is not connected to said outlet portion, said closure member is free to move to said second position.

2. A device as claimed in claim 1 wherein said stem includes clips engageable with said plate member to prevent the closure member from moving beyond said second position.

3. A device as claimed in claim 2 including means for biasing the closure member towards said second position.

4. A device as claimed in claim 3 wherein said means for biasing the closure member comprises a helical spring surrounding said stem and having a first end engageable with the base portion of said closure member and a second end engageable with an internal shoulder on the upper end of said shank.

5. A device as claimed in claim 4 wherein said plate has a downwardly curving inner transitional region terminating in said shank.

6. A device as claimed in claim 5 wherein said diaphragm has an inner edge defining the central hole in the diaphragm, said edge being rounded between opposing faces of the diaphragm.

7. A device as claimed in claim 6 wherein said base portion comprises an annular member integrally joined via ribs to said stem.

8. A device as claimed in claim 7 wherein said sealing means comprises an O-ring surrounding said stem.

9. A device as claimed in claim 8 including a collar on said stem for retaining said O-ring.

10. A device as claimed in claim 9 in combination with an air valve intermediate the faucet and said device, said air valve being closed by water pressure when said faucet is open but being adapted to open when said faucet is closed and said hose is not connected whereby water in said device is drained via said outlet portion of said body member.

11. A device as claimed in claim 1 in combination with an air valve intermediate the faucet and said device, said air valve being closed by water pressure when said faucet is open but being adapted to open when said faucet is closed and said hose is not connected whereby water in said device is drained via said outlet portion of said body member.

* * * * *